July 9, 1968  F. S. DYE, JR  3,391,494
ELECTRICAL CONTROL ARRANGEMENT FOR A SANDBLASTING MACHINE
Filed June 21, 1967  2 Sheets-Sheet 1
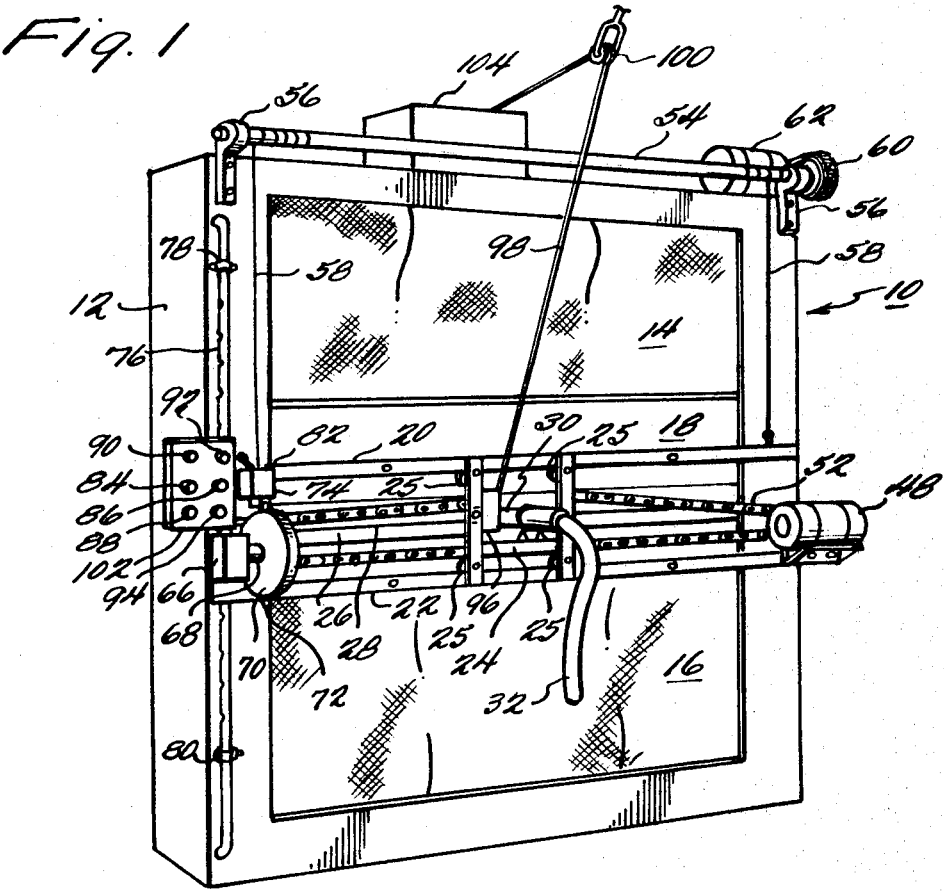
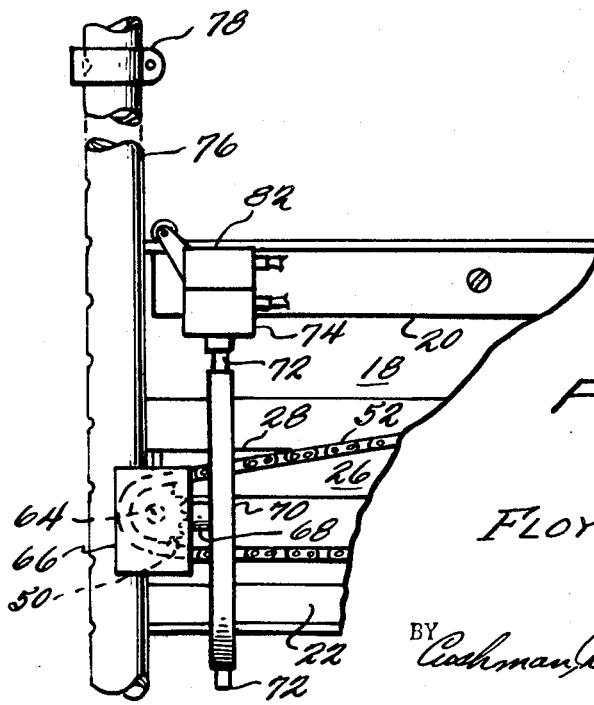
INVENTOR
FLOYD S. DYE, JR.
BY Cushman Darby & Cushman
ATTORNEYS July 9, 1968  F. S. DYE, JR  3,391,494
ELECTRICAL CONTROL ARRANGEMENT FOR A SANDBLASTING MACHINE
Filed June 21, 1967  2 Sheets-Sheet 2

INVENTOR
FLOYD S. DYE, JR

BY Cushman, Darby & Cushman
ATTORNEYS

United States Patent Office 3,391,494
Patented July 9, 1968

3,391,494
ELECTRICAL CONTROL ARRANGEMENT FOR
A SANDBLASTING MACHINE
Floyd S. Dye, Jr., Rte. 1, Elberton, Ga. 30635
Continuation-in-part of application Ser. No. 558,206,
June 13, 1966. This application June 21, 1967, Ser.
No. 647,804
5 Claims. (Cl. 51—8)

ABSTRACT OF THE DISCLOSURE

Apparatus for electrically controlling the position of the nozzle of a sandblasting machine. The control is operated either manually or automatically. A first reversible motor is utilized to cause horizontal movement of the nozzle and a second reversible motor moves the nozzle vertically. Rotation of the motors is dictated either directly from an electrical control panel or automatically by limit switches responsive to nozzle location. A capping device is provided to cover the nozzle tip in the absence of electrical power to the control arrangement thereby protecting the workpiece from damage by excess sandblast.

---

This application is a continuation-in-part of application Ser. No. 558,206, filed on June 13, 1966.

The present invention relates to an electrical arrangement for controlling the position of a nozzle of a sandblasting machine to thereby permit precise direction of the sandblast onto the workpiece.

In the past efforts have been made to provide automatic control for sandblasting machines. One such arrangement has taken the form disclosed in Patent 2,953,876, issued on Sept. 27, 1960. This structure utilizes compressed air to control nozzle movement in the horizontal direction. The employment of a suitable piston and cylinder arrangement to effect nozzle movement by compressed air greatly increases space required for such a machine. This can be appreciated by reference to the patent wherein it becomes apparent that to move the nozzle to the righthand side of the machine, the piston rod and the nozzle carriage actuator must extend beyond the machine by a distance nearly half the width of the machine. It can also be seen from the patent that use of the cumbersome piston cylinder restricts the nozzle in traversing the full width of the machine. A further deficiency of such known equipment is the irregularity of the air supply to the nozzle moving cylinder. This causes uneven travel of the nozzle and contributes to a poor distribution of the sandblast on the workpiece.

It is therefore a principal object of the invention to provide a compact electrical control arrangement for a sandblasting machine which requires a minimum of space. Such an arrangement permits a number of machines to be positioned closely to one another so that a single operator can monitor the simultaneous operation of several sandblasters.

Another object is to provide a control arrangement which permits the nozzle to travel the full width and height of the sandblasting machine.

An additional object of the electrical nozzle control arrangement is to move the nozzle at a smooth constant rate thereby improving the effect of the sandblast on the workpiece.

A still further object of the invention is to provide a safety capping device to interrupt the sandblast to the workpiece should the power supply to the electrical means controlling the nozzle movement be interrupted.

The foregoing objects are accomplished by providing first and second reversible electric motors to drive the nozzle in the horizontal and vertical directions respectively. The motors may be controlled directly by actuation of suitable pushbuttons electrically connected to the motors, or they may be under the automatic control of a preselected program determined by limit switches which are actuated in response to nozzle location. A normally energized electrical device is associated with a nozzle capping arrangement whereby on interruption of power supply to the control system, the device is de-energized so as to release a cap which prevents the sandblast exiting from the nozzle from reaching the workpiece.

The entire scope of the invention will become more fully apparent when considered in light of the following detailed description of an illustrative embodiment of the invention and from the appended claims.

The illustrative embodiment may be best understood by reference to the accompanying drawings, wherein:

FIGURE 1 is a view in perspective of a sandblasting machine incorporating the electrical control arrangement of the invention;

FIGURE 3 is a fragmented, enlarged view of the movement limiting arrangement for the nozzle, the control panel 102 of FIGURE 1 being omitted for convenience of illustration.

Figure 2:
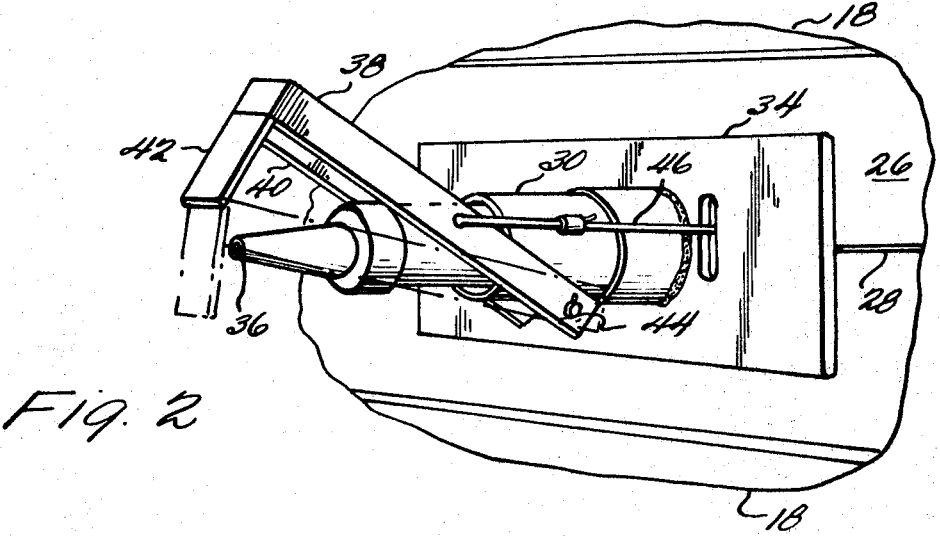
FIGURE 2 is a fragmented view in perspective of the nozzle capping arrangement located on the opposite side of the sandblasting machine from that observable in FIGURE 1.

Referring now to the drawings, the structure of the sandblaster will first be described in detail. In FIGURE 1 there is illustrated a conventional sandblasting machine curtain generally indicated at 10. This curtain comprises a main frame 12 for supporting two spaced, flexible curtain portions 14 and 16. The bottom edge of curtain portion 14 and the top edge of curtain portion 16 are joined by a plate member 18. A pair of spaced horizontally extending rail members 20 and 22 are suitably attached to plate 18. A carriage assembly 24 having grooved wheels 25 is supported between rails 20 and 22. The wheels permit the carriage to be moved along the rails in a horizontal path. Plate 18 is provided with a horizontally extending slot (not shown) which is covered with a flexible sealing element 26 having a slit 28 along the length thereof. A sandblast nozzle 30 is firmly supported by carriage 24 and projects through the slit 28. A flexible hose 32 serves to carry sand under high pressure from a compression source to nozzle 30.

FIGURE 2 illustrates the details of the nozzle portion which projects through the slit in flexible sealing element 26. A deflection plate 34 is attached to the nozzle in closely spaced relationship with respect to element 26. Plate 34 and element 26 insure that sand exiting from nozzle tip 36 cannot be deflected back through the opening in plate 18 through which the nozzle projects.

A safety capping arrangement is also associated with the portion of nozzle 30 shown in FIGURE 2. More particularly, arms 38 and 40, interconnected at one of their ends by a cap element 42, are pivotally connected to nozzle 30 at their other ends, as indicated at 44. Cap 42 is normally held out of the path of sand exiting from nozzle tip 36 by a force exerted on wire 46 connected intermediate the ends of arm 38 and passing through the deflection plate 34 and slit 28 to the opposite side of the sandblast curtain 10. When this force is released, as for example in the case of power failure, which also terminates movement of the nozzle, the cap arrangement pivots about 44 to the position shown in dash lines to thereby interpose cap 42 between the nozzle tip 36 and the workpiece. The workpiece is thereby prevented from damage which would otherwise be caused by an excess flow of sand against a localized portion of the workpiece.

Now that structure of the sandblasting apparatus has been described, attention will be directed to the control mechanisms for positioning the sandblasting nozzle 30. In this regard, reference will be made to FIGURES 1 and 3. A reversible drive motor 48 is fixed to the lower horizontal rail 22 at one end thereof. A driving element in the form of a sprocket (not shown) is appropriately connected to the drive shaft of motor 48. An additional sprocket 50 (FIGURE 3) which serves as a rotatable guide element is supported between rails 20 and 22 at the opposite end of rail 22 from that to which motor 48 is mounted. A flexible length of chain 52 is joined at one of its ends to one side of carriage 24. This chain passes over the sprocket associated with motor 48, past carriage 24, around sprocket 50, and back to carriage 24 where its other end is connected to the side of the carriage opposite that to which the first chain end is connected. From the foregoing description it is apparent that as motor 48 is driven in forward or reverse directions, the carriage 24 is moved horizontally along rails 20 and 22.

In addition to horizontal movement, the carriage 24 also may be translated vertically. This is accomplished by journalling a horizontally extending shaft 54 in support elements 56 mounted at the top, and at opposite sides, of main frame 12. Shaft 54 is connected to the upper rail 20 of the carriage supporting arrangement by means of cables 58 positioned close to the ends of shaft 56. A gear 60 mounted at one end of shaft 56 is suitably interconnected with the drive shaft of a reversible motor 62 fixed to frame 12. As this motor is operated, shaft 54 is rotated to either wind cables 58 thereabout to raise the nozzle-supporting carriage 24, or to unwind the cables thereby lowering the carriage.

It should be understood that curtain portion 14 is preferably supplied from a roll fixed to frame 12 near the top so that as carriage 24 is lowered, curtain material is unrolled, whereas when carriage 24 is raised, curtain material is wrapped on the roll. Curtain portion 16 is similarly supplied from a roll fixed to frame 12 near its bottom.

The invention provides, as is most clearly illustrated in FIGURE 3, means for controlling the limits of travel of the nozzle-supporting carriage 24 in the horizontal and vertical directions. With respect to the former, this is accomplished by extending the shaft 64, which carries sprocket 50, to a gear reduction box 66. The output shaft 68 from box 66 is connected to a disk 70 to rotate same. Since the rotation of sprocket 50 is dependent on that of motor 48, the appropriate selection of gears in box 66 results in disk 70 rotating in proportion to the horizontal travel of the carriage 24. This fact is utilized by selectively attaching projecting cam elements 72 to the circumferential edge of disk 70. The selective positioning of elements 72 is performed by the operator who manually moves the carriage horizontally to the desired limits of travel for the particular workpiece to be operated upon and sets the cam elements in positions which, during automatic operation, will permit the carriage to move horizontally only within these limits. A limit switch 74, attached to rail 20, is placed in the path of these cam elements. Thus, during automatic operation of the equipment, each time a cam element 72 engages limit switch 74, motor 48 reverses to cause the nozzle to change its direction of movement. This operation will be described in detail hereinafter.

To control the limits of vertical movement of the nozzle, a vertically extending bar 76 is mounted on frame 12. A pair of cams 78 and 80 are selectively positioned in spaced relationship along bar 76. These cams are located in the path of a limit switch 82. In a fashion similar to that described with respect to switch 74, the actuation of switch 82 results in the reversal of motor 62 to change the direction of vertical movement of the nozzle.

Figure 4:
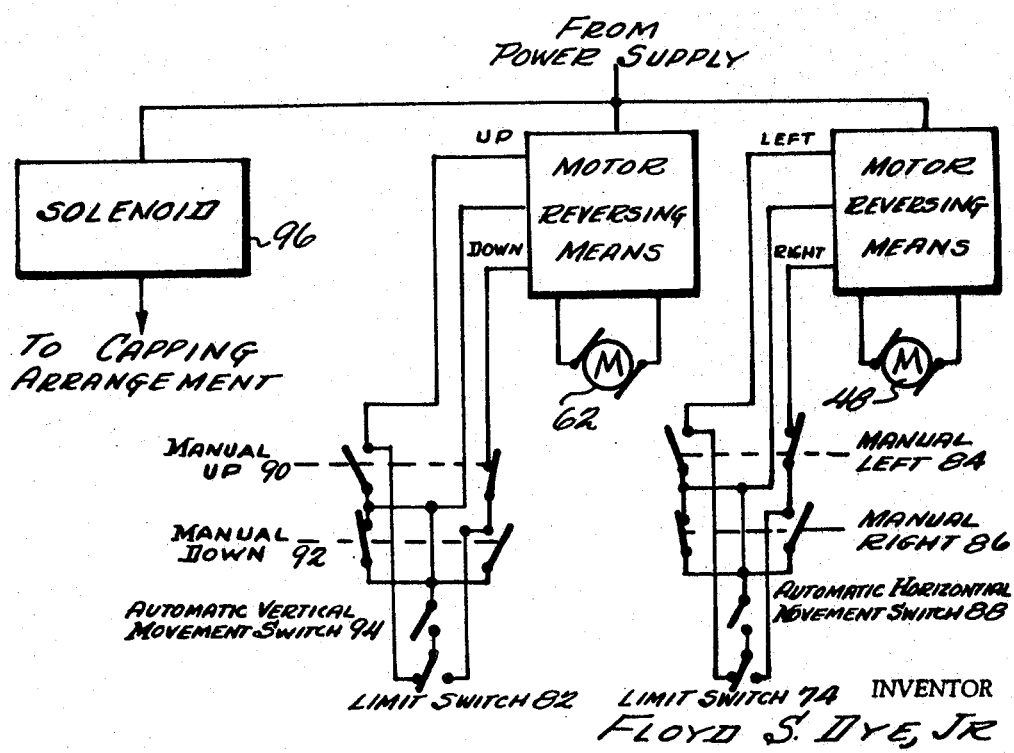
FIGURE 4 is a block diagram illustrating one form which the electrical control circuitry may take.

Now that the mechanical structure of the invention has been discussed, an electrical system for implementing either manually or automatically controlled movement of the nozzle will be described. In this regard, a representative circuit is illustrated in FIGURE 4. The circuit schematically illustrates identical arrangements for controlling each of the reversible motors 48 and 62. For purposes of description, the system for motor 48 will be detailed. The motor 48 is connected to a motor reversing means which in practice may take many forms. For example, a magnetic switch could be employed, the actuation of which changes the sense of energization of the reversible motor's field thereby reversing its operation. The motor reversing means is controlled by the selective actuation of a manual left switch 84, a manual right switch 86 and an automatic horizontal movement switch 88. These switches are illustrated in FIGURE 1 as being of the conventional pushbutton type. Switches 84 and 86 each comprise a ganged contact pair arranged such that the closing of one contact of each pair results in the opening of the other contact. Since each contact is in a separate energizing path to the motor reversing means, such an arrangement insures that only one path to the reversing means can be completed. Switch 88 when actuated permits the operation of limit switch 74 to effect the motor reversing means.

The illustrated positions of switches 84, 86 and 88 are those which exist when the system is at rest. When it is desired to manually move the nozzle to the left, switch 84 is actuated to complete a first current path to the motor reversing means. For movement to the right, the same procedure would be followed except that switch 86 would be operated. If automatic operation is desired, switch 88 is closed. Since limit switch 74 is in the position shown, initial automatic movement of the carriage-supported nozzle is to the left. This movement continues until the cam element 72 limiting travel to the left engages switch 74 to reverse its position. When this occurs, the carriage begins its travel to the right and so continues until the other cam element 72 returns the limit switch to the illustrated position.

Of course, the operation of the vertical movement control means is the same as that for horizontal movement. The manual up and manual down switches are designated as 90 and 92, respectively, and the automatic vertical movement switch is labelled as 94, in FIGURES 1 and 4.

The control device for the capping arrangement is illustrated in FIGURES 1, 2 and 4. More specifically, a solenoid is connected to the electrical power supply for the system. This solenoid is mounted on carriage 24 and is designated as 96. The armature of solenoid 96 is connected to wire 46 which is most clearly shown in FIGURE 2. A flexible electrical connection 98 from solenoid 96 is passed over pulley 100 to the power supply. So long as the power supply to the control system is uninterrupted, solenoid 96 is energized, and the capping device is held in the position shown in the full lines of FIGURE 2. When the power supply is interrupted, the solenoid armature is released thereby permitting the cap 42 to cover the nozzle tip 36 thereby preventing sand exiting from the nozzle from reaching the workpiece towards which the nozzle is directed.

For the purposes of clarity, FIGURE 1 does not illustrate the electrical connections between the various components. However, it should be appreciated that switches 84, 86, 88, 90, 92 and 94 are connected from the control panel 102, attached to frame 12, to box 104 located at the top of the sandblasting machine. Box 104 contains the motor reversing means for the motors 48 and 62, as well as the connections from the control arrangement to the power supply. Of course, each reversing means is also electrically connected from box 104 to its respective motor.

From the foregoing description it is apparent that the present invention provides an electrical control for a sandblasting machine which permits the nozzle to be moved independently or simultaneously in the vertical and horizontal directions either under manual control or automatically. Due to the compactness of the equipment required for electrical control, the travel of the nozzle-supporting carriage 24 extends over substantially the full width and height of the machine, without requiring structure which extends significantly beyond the machine. The safety capping arrangement insures that the workpiece will not be damaged in the event of power supply interruption to the electrical control system.

The above-described embodiment is illustrative of a preferred embodiment of the invention but is not intended to limit the possibilities of insuring the features of full nozzle travel at constant speed. For example, many other arrangements for the limit switches are possible. It should also be appreciated that although the invention described herein is particularly adaptable to lettering or otherwise carving on stone, it is applicable to other environments in which comminuted abrasive materials are directed under high pressure towards a work surface for eroding or cleaning same. The structure disclosed herein is an example of an arrangement in which the inventive features of this disclosure may be utilized, and it will become apparent to one skilled in the art that certain modifications may be made within the spirit of the invention as defined by the appended claims.

What is claimed is:

1. A machine for directing comminuted abrasive material towards a workpiece, comprising: a nozzle through which said material is passed; a carriage supporting said nozzle; a first reversible electric motor operatively connected to said carriage for moving same in a horizontal direction; a second reversible electric motor operatively connected to said carriage for moving same in a vertical direction; a limit switch operatively connected to each of said reversible motors; adjustable cam means for selectively actuating said limit switches in response to carriage movement to reverse the motor associated with an actuated switch; manually operable switches selectively operatively connected to said reversible motors to control said motors independently of the limit switches; a capping arrangement positioned in proximity to said nozzle; and means responsive to the interruption of a power supply to said machine for interposing said capping arrangement between the nozzle and said workpiece.

2. A machine for directing comminuted abrasive material towards a workpiece, comprising: a nozzle through which said material is passed; a carriage supporting said nozzle; a first reversible electric motor mounted at one side of said machine to drive a first sprocket; a second sprocket attached to the opposite side of said machine; a length of chain connected at opposite sides of said carriage and passing over said first and second sprockets whereby rotation of the first motor causes the carriage to move in a horizontal direction; a second reversible electric motor operatively connected to said carriage for moving same in a vertical direction; a limit switch operatively connected to each of said reversible motors; a plurality of adjustable cam means for selectively actuating said limit switches in response to carriage movement to reverse the motor associated with an actuated switch; a gear reduction box operatively connected to one of said sprockets; a disk connected to the gear reduction box to be rotatably driven thereby; at least two of said adjustable cam means being mounted on the disk to engage one of the limit switches as the disk is rotated; and manually operable switches selectively operatively connected to the reversible motors to control said motors independently of the limit switches.

3. A machine as set forth in claim 1, wherein said capping arrangement is pivotally connected to the nozzle and said means responsive to power supply interruption includes a solenoid normally energized by the power supply and means connecting the capping arrangement to said solenoid to retain the capping arrangement out of the path between the nozzle and the workpiece when the solenoid is energized.

4. A machine as set forth in claim 2, further comprising: a capping arrangement positioned in proximity to said nozzle; and means responsive to the interruption of a power supply to said machine for interposing said capping arrangement between the nozzle and said workpiece.

5. A machine as set forth in claim 4, wherein said capping arrangement is pivotally connected to the nozzle and said means responsive to power supply interruption includes a solenoid normally energized by the power supply and means connecting the capping arrangement to said solenoid to retain the capping arrangement out of the path between the nozzle and the workpiece when the solenoid is energized.

References Cited
UNITED STATES PATENTS

| | | | |
|---|---|---|---|
| 1,882,541 | 10/1932 | Billman | 51—8 |
| 2,495,269 | 1/1950 | Lindmark | 51—15 |
| 2,611,219 | 9/1952 | Gladfelter | 51—8 |
| 2,953,876 | 9/1960 | Zieber et al. | 51—8 |
| 3,283,450 | 11/1966 | Greenberg et al. | 51—14 X |

LESTER M. SWINGLE, *Primary Examiner.*